April 28, 1953   C. E. NORBERG   2,636,704
DETACHABLE HOSE SUPPORT
Filed Nov. 28, 1949
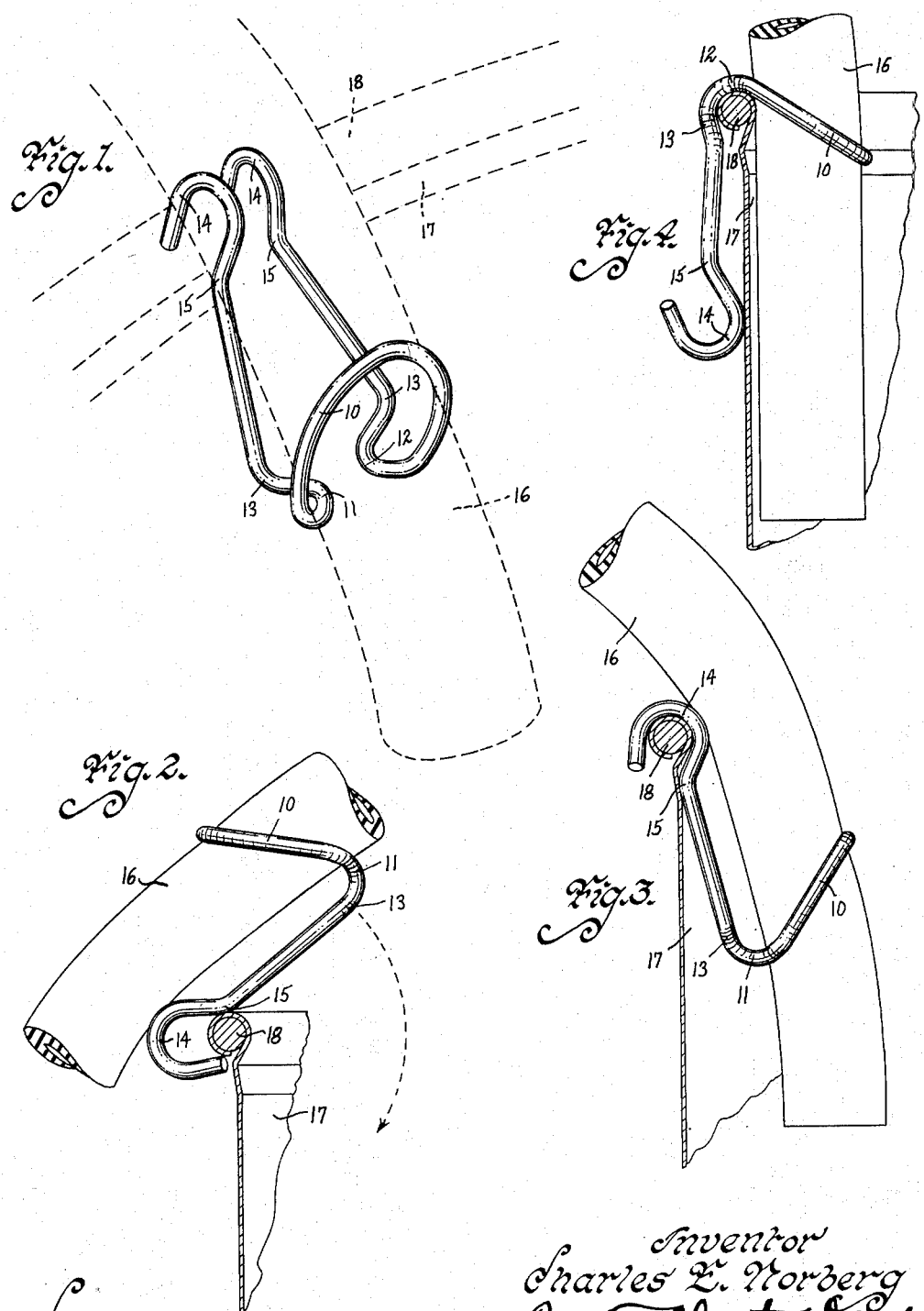
Inventor
Charles E. Norberg
by M. Talbert Dick
Attorney
Witness
Edward R. Leeby Patented Apr. 28, 1953

2,636,704

UNITED STATES PATENT OFFICE 2,636,704

DETACHABLE HOSE SUPPORT

Charles E. Norberg, Des Moines, Iowa

Application November 28, 1949, Serial No. 129,777

3 Claims. (Cl. 248—79)

My invention relates to a supporting device for detachably securing the free end of a hose within a container such as a wash tub or the like.

One of the most common uses for a hose is in filling a container with a fluid such as water or the like. Especially in homes, a hose is used to fill wash tubs and while this is being done, a good deal of time can be saved if the hose does not have to be manually held. If the free end of the hose is merely placed into the tub the pressure of the water passing through tends to cause it to jump out of the tub. To prevent this, there are various hooks and snaps on the market to hold the hose onto the tub but such means are complicated in structure and operation.

Therefore, the principal object of my invention is to provide a simple hose support that can be detachably secured to the free end portion of a hose and to the rim of a container so that fluid passing through the hose will fall into the container and the hose will remain in position until manually removed.

A further object of this invention is to provide a detachable hose support of the above class that can be affixed to a container in a variety of ways of which one way at least provides a locking means to prevent this device from being accidentally detached therefrom.

Still further objects of this device are to provide a hose holder that is made from one strand of spring rod material; that has no screws, bolts, springs or other independent parts that require manipulation or that could be lost and that can easily and quickly be attached or detached without the need for any tools.

A still further object of this invention is to provide a hose support of the above classes that is economical in manufacture and efficient in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of this device about to be mounted on the rim of container indicated by the substantially horizontal dotted lines and with the vertical dotted lines indicating the position of the free end portion of a hose within the container, Fig. 2 is a side view of this device supporting a hose and about to be mounted on the rim of a container before the free end of the hose is placed therein, Fig. 3 is a side view of this support shown mounted on the rim of a container and supporting the free end of a hose within the container, and Fig. 4 is a side view of this device similar to Fig. 3 but showing a variation in the position in which this holder can be arranged.

Referring to the drawings I have made my hose support from a single strand of spring rod material. As viewed in Fig. 1, this strand is bent at its center to form the open ring portion 10. Each of the free end lengths of the strand are then bent upwardly and inwardly toward but not to each other and thence each is bent backwardly on itself and away from the other to form the respective ear portions 11 and 12, as shown in Fig. 1. From the portions 11 and 12 the strands are then continued outwardly and upwardly away from each other to the bend points 13. From the bend points 13 they extend forwardly, upwardly towards each other with the free ends respectively bent downwardly and back upon itself to form the circular hook portions 14, as shown in Fig. 1. In bending the portions 11 and 12 to form these hooks the shoulders 15 will be formed, as shown in the drawings. The ring 10 is not a completely enclosed ring as shown in Fig. 1 where the ears 11 and 12 are shown in spaced relation. The formation of the ears 11 and 12 and the shoulder at the bend points 13 serve to yieldingly resist expansion of the ring 10 so that it will securely but detachably hold a hose, as illustrated in the drawings.

It should be noted that the angle between the ring 10 and the portions 11 and 12 forward of the bend points 13 is less than a right angle, as shown in Figs. 2, 3 and 4. By this construction the hose 16 is held within the ring 10 by frictional engagement after being manually inserted and positioned therein.

The numeral 17 designates a container having a rim 18.

When this support is constructed as described it can be used in the following ways: Figs. 1–3 illustrate one method of mounting this holder, and Fig. 4 illustrates still another.

As shown in Figs. 1–3, the free end of a hose 16 is passed through the ring 10 in a direction away from the hooks 14. The hooks are then positioned adjacent and engaging the rim 18, as shown in Fig. 2 and snapped into place thereon. As this is done, the free end of the hose 16 is moved forwardly and downwardly and inserted into the container, as shown in Fig. 3. The distance between the shoulders 15 and the free end of the hooks 14 should be small enough so that the hooks 14 will require a slight manual pressure when being snapped onto the rim 18. Thus positioned the shoulders 15 will bear against the inside wall of the container 17 and this device will securely hold the hose 16 within the container. To remove this holder the hose is manually moved in a direction opposite to the arrow in Fig. 2 and easily detached from the container.

In Fig. 4 the free end of the hose 16 is passed through the ring 10 in a direction toward and past the backs of the hooks 14. When this is done it will be found that the hose engages the hooks and the construction of this device is such that normally the hooks 14 will yieldingly resist any tendency to be moved away from the hose. To mount this support in this manner, the hooks 14 are passed along the outside of the rim and container so that the shoulders at the bend points 13 will engage the underside of the rim 18, as shown in Fig. 4. At the same time the hose will be adjacent the inside wall of the container. This will, of course, move the hooks 14 and hose 16 away from each so that the hose will be held in place by frictional engagement. To remove the support when mounted in this way it is only necessary to manually pull it off the container.

This hose support, while simple in construction is very efficient for its intended purposes. It has no screws, bolts, springs or other attachable parts that require manipulation or adjustment for its use. Consequently, it has no parts that can be lost which would require replacement or render the support inoperative.

Some changes may be made in the construction and arrangement of my detachable hose support without departing from the real spirit and purpose of my invention, and it is my intention to cover by my claims, any modified forms of structure or use of mechanical equivalents which may be reasonably included within their scope.

I claim:

1. In a device of the class described, a spring rod member bent at its center to form a ring portion for embracing and holding an object to be supported thereby, the resulting two rod length portions then each bent in the same direction at an angle to said ring portion, thence bent inwardly towards but not to each other and thence each said rod bent backwardly on itself and away from the other to form respective ear portions in spaced relationship that yieldingly hold said ring portion against expansion and thereby adapting said ring portion to yieldingly frictionally embrace a hose when inserted therein, said rod lengths thence bent so that they converge and terminate in spaced relationship, and the free end of each length bent back upon itself to form a hook member, and said hooks adapted to be snapped onto a supporting member such as the rim of a tub.

2. In a device of the class described, a spring rod member bent at its center to form a ring portion for embracing and holding an object to be supported thereby, the resulting two rod length portions then each bent in the same direction at an angle to said ring portion, thence bent inwardly towards but not to each other and thence each said rod bent backwardly on itself and away from the other to form respective ear portions in spaced relationship that yieldingly hold said ring portion against expansion and thereby adapting said ring portion to yieldingly frictionally embrace a hose when inserted therein, said rod lengths thence bent so that they converge and terminate in spaced relationship, and the free end of each length bent back upon itself to form a hook member, said hooks adapted to be snapped onto a supporting member such as the rim of a tub, and said ears also providing a selective means for mounting said device on the rim of a container at times.

3. In a device of the class described, a spring rod member bent at its center to form a ring portion for embracing and holding an object to be supported thereby, the resulting two rod length portions converging towards but not to each other in forming said ring portion and from this point each bent in the same direction at an angle to said ring portion, thence bent inwardly towards but not to each other and thence each said rod bent backwardly on itself and away from the other to form respective ear portions in spaced relationship that yieldingly hold said ring portion against expansion and thereby adapting said ring portion to yieldingly frictionally embrace a hose when inserted therein, said rod lengths thence bent so that they converge and terminate in spaced relationship, and the free end of each length bent back upon itself to form a hook member, and said hooks adapted to be snapped onto a supporting member such as the rim of a tub.

CHARLES E. NORBERG.

References Cited in the file of this patent

UNITED STATES PATENTS

| Number | Name | Date |
|---|---|---|
| 194,707 | Merrill | Aug. 28, 1877 |
| 960,404 | Rigby | June 7, 1910 |
| 1,240,377 | Seng | Sept. 18, 1917 |
| 2,183,188 | French | Dec. 12, 1939 |
| 2,487,094 | Brown | Nov. 8, 1949 |